(12) United States Patent
Kawazoe et al.

(10) Patent No.: US 10,771,756 B2
(45) Date of Patent: Sep. 8, 2020

(54) SIGNAL TRANSMISSION DEVICE AND SIGNAL TRANSMISSION METHOD

(71) Applicant: SONY CORPORATION, Tokyo (JP)

(72) Inventors: Daisuke Kawazoe, Kanagawa (JP); Kenichi Sano, Kanagawa (JP); Jun Hashizume, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/086,647

(22) PCT Filed: Mar. 17, 2017

(86) PCT No.: PCT/JP2017/010868
§ 371 (c)(1),
(2) Date: Sep. 20, 2018

(87) PCT Pub. No.: WO2017/169887
PCT Pub. Date: Oct. 5, 2017

(65) Prior Publication Data
US 2019/0089938 A1  Mar. 21, 2019

(30) Foreign Application Priority Data
Mar. 31, 2016  (JP) .................................. 2016-072105

(51) Int. Cl.
*H04N 9/804* (2006.01)
*H04N 1/41* (2006.01)
*H04N 1/415* (2006.01)
*H04N 5/77* (2006.01)

(52) U.S. Cl.
CPC ............. *H04N 9/8042* (2013.01); *H04N 1/41* (2013.01); *H04N 1/415* (2013.01); *H04N 5/772* (2013.01)

(58) Field of Classification Search
CPC ........ H04N 9/8042; H04N 1/415; H04N 1/41; H04N 5/772
See application file for complete search history.

(56) References Cited

U.S. PATENT DOCUMENTS

| 2002/0057903 A1* | 5/2002 | Kubo | ..................... H04N 5/772 386/225 |
| 2006/0256218 A1* | 11/2006 | Kobayashi | ........... H04N 5/2352 348/294 |
| 2008/0231918 A1* | 9/2008 | Nagase | .................. H04N 1/486 358/483 |

FOREIGN PATENT DOCUMENTS

| JP | 07-193755 A | 7/1995 |
| JP | 2002-152680 A | 5/2002 |
| JP | 2012-124837 A | 6/2012 |

OTHER PUBLICATIONS

International Search Report and Written Opinion of PCT Application No. PCT/JP2017/010868, dated May 16, 2017, 07 pages.

\* cited by examiner

*Primary Examiner* — Marcos L Torres
(74) *Attorney, Agent, or Firm* — Chip Law Group

(57) ABSTRACT

The present disclosure relates to a signal transmission device, a signal transmission method, and a program that are capable of reducing the influence of a quantization error. A quantization error notification unit notifies the stage after a bit precision constraint region of a quantization error generated in a quantization processing unit that performs a quantization process on a signal to be transmitted via the bit precision constraint region that is a region where a bit precision constraint occurs. A quantization error reception unit receives the quantization error, and supplies the quantization error to an inverse quantization processing unit that performs an inverse quantization process on the signal transmitted via the bit precision constraint region. The present technology can be applied to an image signal transmission device that transmits image signals, for example.

12 Claims, 11 Drawing Sheets

FIG. 2
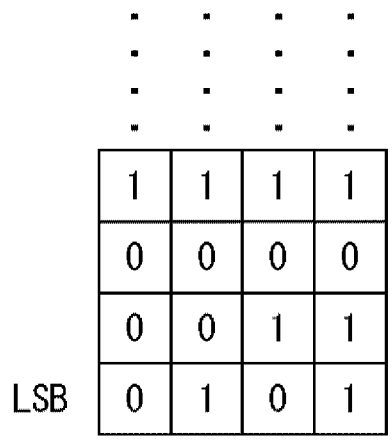
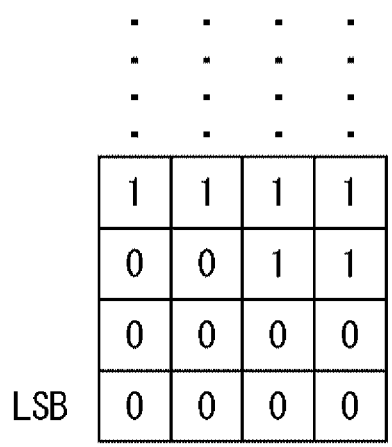

FIG. 4
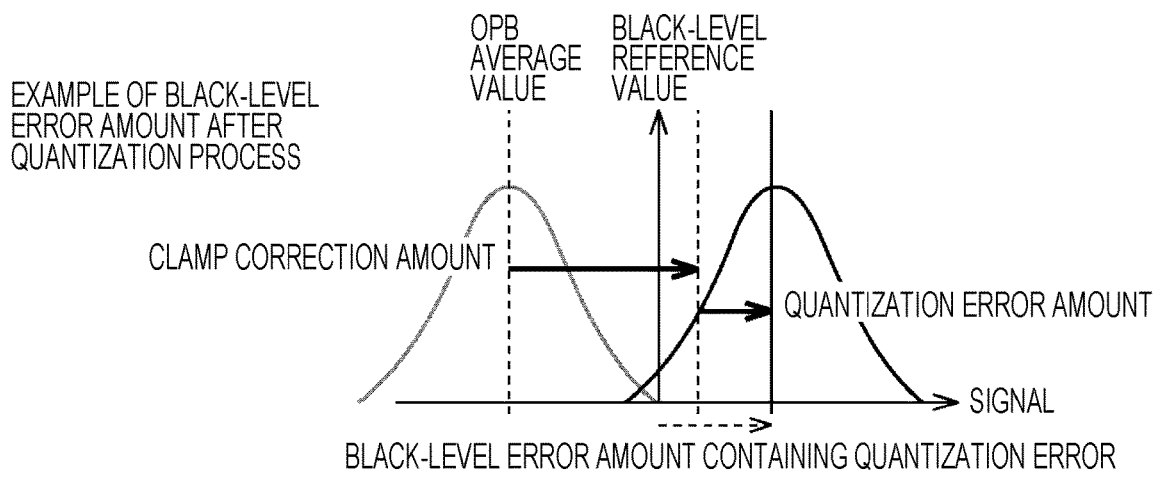
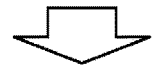
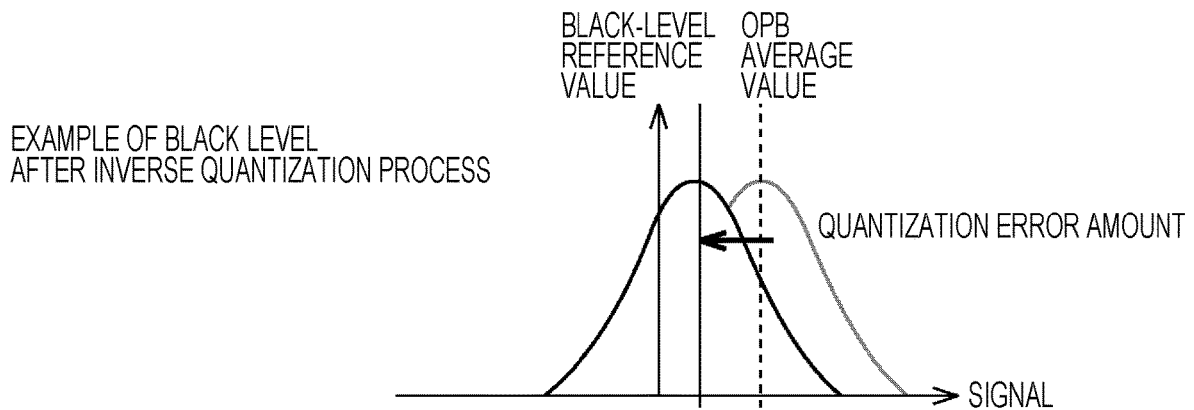

SIGNAL TRANSMISSION DEVICE AND SIGNAL TRANSMISSION METHOD

CROSS REFERENCE TO RELATED APPLICATIONS

This application is a U.S. National Phase of International Patent Application No. PCT/JP2017/010868 filed on Mar. 17, 2017, which claims priority benefit of Japanese Patent Application No. JP 2016-072105 filed in the Japan Patent Office on Mar. 31, 2016. Each of the above-referenced applications is hereby incorporated herein by reference in its entirety.

TECHNICAL FIELD

The present disclosure relates to a signal transmission device, a signal transmission method, and a program, and more particularly, to a signal transmission device, a signal transmission method, and a program that are capable of reducing the influence of a quantization error.

BACKGROUND ART

As the image processing devices have become faster and more precise, the amount of image data to be handled has increased in conventional cases. On the other hand, there is a high degree of necessity for quantization processes for digital image signals, because of regulations or physical constraints on communication bands, memory capacities, circuit sizes, and the like. As a result, quantization processes are performed before communication, memory, large-scale circuits, and the like. It should be noted that, in many cases, a quantization process is performed during a lower-bit rounding process, so as to cope with the increased speed of the image processing device at the preceding stage, or cope with the versatility of the image processing device at the receiving end or the reading end, for example.

Meanwhile, enhanced functions are required in image processing these days, and more and more cases involve image processing such as a noise reduction process and a digital gain process for coping with low illuminance, and a dynamic range expansion process and a gradation conversion process for coping with high dynamic ranges.

However, in image processing such as a noise reduction process, a digital gain process, a gradation conversion process, and a dynamic range expansion process, there exist performance limitations due to bit precision. Therefore, the image processing device at the subsequent stage having bit precision quantized to conform to the communication band, the memory capacity, or a large-scale circuit needs to perform image processing with the quantized bit precision, and is unable to exhibit sufficient performance.

It should be noted that, in the image processing device at the preceding stage that is required to have a higher speed, it is difficult to execute a noise reduction function and a gradation conversion process that require a long processing time. Further, to restore the bit precision of the image processing device at the subsequent stage, an inverse quantization process needs to be performed. However, quantization through a lower-bit rounding process is a lossy process, and therefore, the generated quantization error cannot be restored.

For example, Patent Document 1 discloses an image decoding device capable of stably reducing strangeness and unclarity caused by truncation of bit planes.

CITATION LIST

Patent Document

Patent Document 1: Japanese Patent Application Laid-Open No. 2012-124837

SUMMARY OF THE INVENTION

Problems to be Solved by the Invention

As described above, the quantization error generated in a quantization process cannot be restored in conventional cases, and therefore, the processing at the subsequent stage is affected by the quantization error. In view of this, there is a demand for reductions of the influence of such quantization errors.

The present disclosure is made in view of those circumstances, and is to reduce the influence of a quantization error.

Solutions to Problems

A signal transmission device according to one aspect of the present disclosure includes: a quantization error notification unit that notifies a stage after a bit precision constraint region of a quantization error generated in a quantization processing unit that performs a quantization process on a signal to be transmitted via the bit precision constraint region, the bit precision constraint region being a region where a bit precision constraint occurs; and a quantization error reception unit that receives the quantization error, and supplies the quantization error to an inverse quantization processing unit that performs an inverse quantization process on the signal transmitted via the bit precision constraint region.

A signal transmission method or a program according to one aspect of the present disclosure includes the steps of: notifying a stage after a bit precision constraint region of a quantization error generated in a quantization processing unit that performs a quantization process on a signal to be transmitted via the bit precision constraint region, the bit precision constraint region being a region where a bit precision constraint occurs; and receiving the quantization error, and supplying the quantization error to an inverse quantization processing unit that performs an inverse quantization process on the signal transmitted via the bit precision constraint region.

In one aspect of the present disclosure, the stage after a bit precision constraint region is notified of a quantization error generated in a quantization processing unit that performs a quantization process on a signal to be transmitted via the bit precision constraint region that is a region where a bit precision constraint occurs, and the quantization error is supplied to an inverse quantization processing unit that receives the quantization error and performs an inverse quantization process on the signal transmitted via the bit precision constraint region.

Effects of the Invention

According to one aspect of the present disclosure, influence due to a quantization error can be reduced.

BRIEF DESCRIPTION OF DRAWINGS

FIG. 2 is a diagram for explaining a quantization process.

FIG. 4 is a diagram for explaining a process to be performed in an inverse quantization processing circuit.

MODES FOR CARRYING OUT THE INVENTION

The following is a detailed description of specific embodiments to which the present technology is applied, with reference to the drawings.

Figure 1:
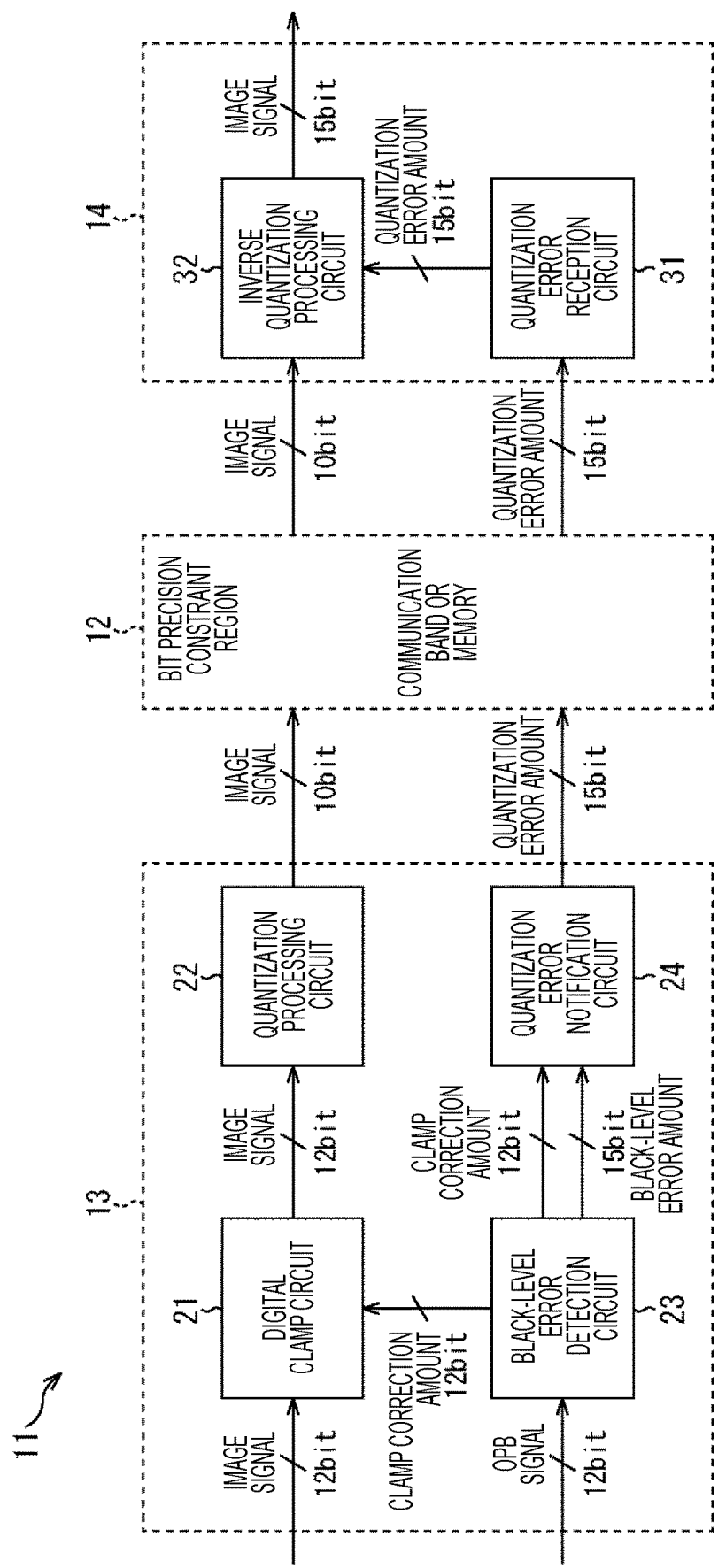
FIG. 1 is a block diagram showing an example configuration of a first embodiment of an image signal transmission device to which the present technology is applied.

FIG. 1 is a block diagram showing an example configuration of a first embodiment of an image signal transmission device to which the present technology is applied.

As shown in FIG. 1, an image signal transmission device 11 is designed so that a bit precision constraint region 12 is disposed between a pre-processing unit 13 and a post-processing unit 14. For example, the image signal transmission device 11 transmits an image signal output from an imaging element (not shown) to an image processing device (not shown) via the bit precision constraint region 12. At that time, in the image signal transmission device 11, signal processing prior to a bit precision constraint by the bit precision constraint region 12 is performed in the pre-processing unit 13, and signal processing after the bit constraint precision by a bit precision constraint region 12 is performed in the post-processing unit 14.

The bit precision constraint region 12 is a region in which a bit precision constraint occurs when an image signal is transmitted. For example, the bit precision constraint region 12 is a communication band for transmitting an image signal by communication, or a memory for temporarily storing an image signal. It should be noted that the bit precision constraint region 12 is not necessarily a communication band, a memory, or the like, and may include a component that causes bit length constraints.

The pre-processing unit 13 includes a digital clamp circuit 21, a quantization processing circuit 22, a black-level error detection circuit 23, and a quantization error notification circuit 24.

The digital clamp circuit 21 performs a process of fixing the black level of an image signal input from an imaging element (not shown) by subtracting a clamp correction amount supplied from the black-level error detection circuit 23 from the image signal. The digital clamp circuit 21 then supplies the image signal from which the clamp correction amount has been subtracted to the quantization processing circuit 22.

The quantization processing circuit 22 performs a quantization process on the image signal supplied from the digital clamp circuit 21, to reduce the number of bits. The quantization processing circuit 22 preferably perform a rounding process with a rounding width matched with the number of bits to be reduced, and can quantize the image signal by deleting the lower bit(s). Specifically, in a case where a 12-bit input is reduced to a 10-bit input and is then output, as shown in FIG. 2, the quantization processing circuit 22 performs a rounding process with a rounding width of 4, and deletes the lower two bits, to quantize the image signal. The quantization processing circuit 22 then supplies the quantized image signal to the subsequent stage via the bit precision constraint region 12.

The black-level error detection circuit 23 detects a black-level error by detecting the signal amount average value in the optical black (OPB) region of the imaging element, and calculates a black-level error amount that is the difference between the OPB signal average value and a black-level reference value. The black-level error detection circuit 23 then calculates a clamp correction amount from the black-level error amount in accordance with the bit precision of the clamp correction amount in the digital clamp circuit 21, and supplies the clamp correction amount to the digital clamp circuit 21. The black-level error detection circuit 23 also supplies the black-level error amount and the clamp correction amount to the quantization error notification circuit 24.

The quantization error notification circuit 24 notifies the stage after the bit precision constraint region 12 of a quantization error amount generated through the quantization process performed by the quantization processing circuit 22. For example, the quantization error notification circuit 24 calculates the amount of the rounding error generated in the quantization processing circuit 22 in accordance with the black-level error amount and the clamp correction amount supplied from the black-level error detection circuit 23, and reports the generated amount as a quantization error amount.

Then, in a case where the bit precision constraint region 12 is a communication band for transmitting an image signal by communication, for example, the quantization error notification circuit 24 adds the quantization error amount to the outside of the effective pixel region of the image signal. By doing so, the quantization error notification circuit 24 can report a quantization error amount. In addition, in a case where the bit precision constraint region 12 is a memory for temporarily storing an image signal, for example, the quantization error notification circuit 24 writes the quantization error amount into a predetermined region in the memory. By doing so, the quantization error notification circuit 24 can report a quantization error amount.

The pre-processing unit 13 is designed as above, and can receive an image signal and an OPB signal input from an imaging element, and output a quantized image signal and the quantization error generated at the time of the quantization of the image signal.

Figure 3:
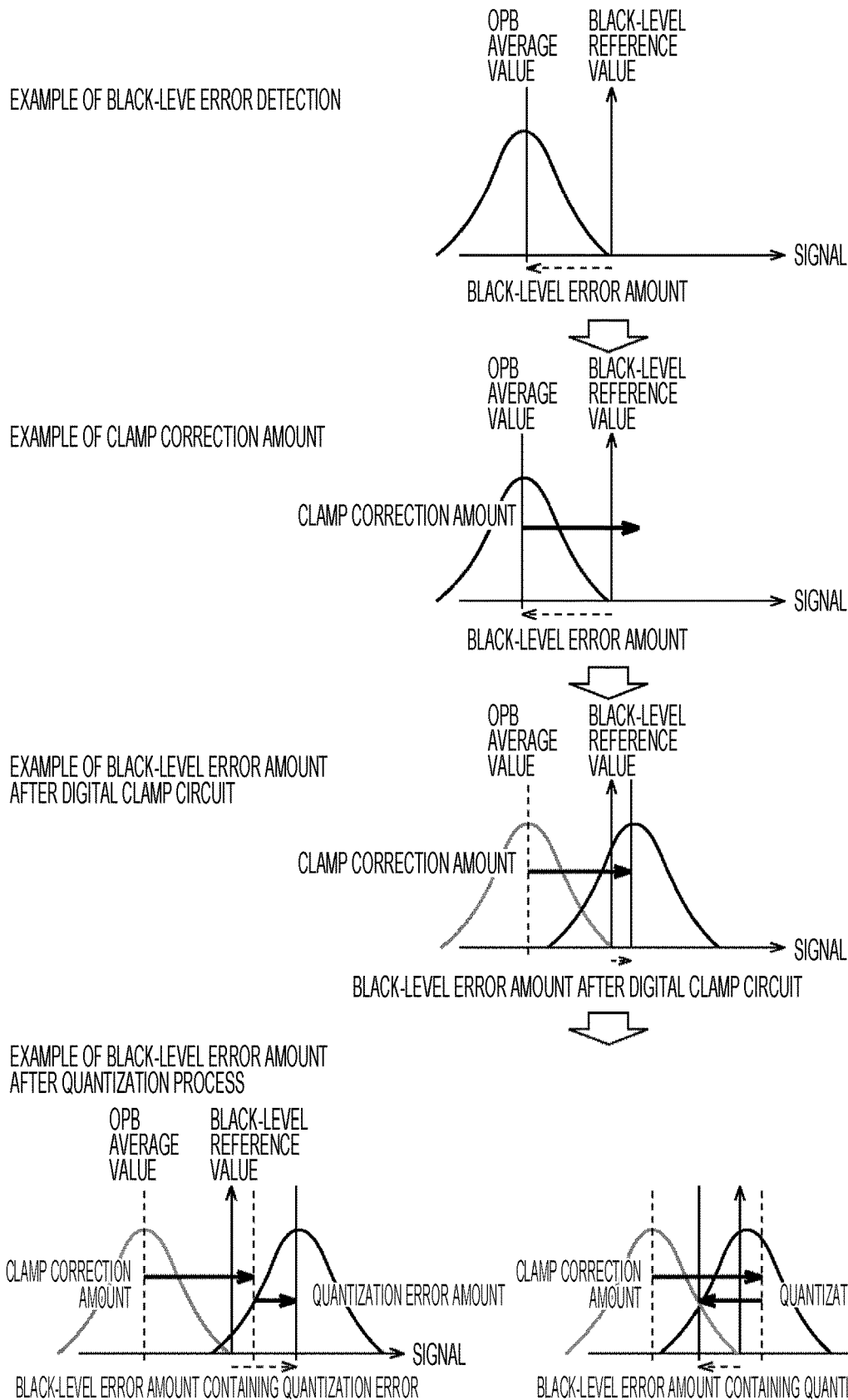
FIG. 3 is a diagram for explaining a process to be performed in a pre-processing unit.

Referring now to FIG. 3, a process to be performed in the pre-processing unit 13 is described.

As shown in the uppermost row in FIG. 3, for example, the black-level error detection circuit 23 obtains a black-level error amount that is the difference between the OPB signal average value and the black-level reference value. As shown in the second row from the top in FIG. 3, the black-level error detection circuit 23 then calculates a clamp correction amount from the black-level error amount, in accordance with the bit precision of the clamp correction amount in the digital clamp circuit 21.

In addition, as shown in the third row from the top in FIG. 3, the digital clamp circuit 21 subtracts the clamp correction amount from the image signal, but the difference between the black-level error amount and the clamp correction amount is generated as the black-level error amount after the digital clamp circuit.

Then, as shown in the fourth row from the top in FIG. 3, when a quantization process is performed by the quantization processing circuit 22 on the image signal output from the digital clamp circuit 21, the above described rounding process is performed, to generate a black-level error containing a quantization error. In this rounding process, the error amount differs between rounding up and rounding down, for example. The black-level error containing the quantization error is then obtained as a quantization error amount by the quantization error notification circuit 24.

The image signal and the quantization error amount are then supplied to the post-processing unit 14 via the bit precision constraint region 12.

The post-processing unit 14 includes a quantization error reception circuit 31 and an inverse quantization processing circuit 32.

The quantization error reception circuit 31 receives the quantization error amount reported by the quantization error notification circuit 24 in the stage before the bit precision constraint region 12, and supplies the quantization error amount to the inverse quantization processing circuit 32. In a case where the quantization error amount is transmitted to the subsequent stage by communication, for example, the quantization error reception circuit 31 can read the quantization error amount added to the outside of the effective pixel region of the image signal. In addition, in a case where the quantization error amount stored in a memory is transmitted to the subsequent stage, the quantization error reception circuit 31 can also read the quantization error amount written in a predetermined region in the memory.

The inverse quantization processing circuit 32 performs an inverse quantization process on the image signal supplied via the bit precision constraint region 12, to increase the number of bits. At that time, the inverse quantization processing circuit 32 subtracts the quantization error amount supplied from the quantization error reception circuit 31 from the image signal. By doing so, the inverse quantization processing circuit 32 can restore the image signal bit precision to the black-level error amount prior to the quantization process performed by the quantization processing circuit 22.

The post-processing unit 14 is designed as above, and, in accordance with the quantization error amount, can output an image signal having its bit precision restored to the black-level error amount prior to the quantization.

Referring now to FIG. 4, a process to be performed in the post-processing unit 14 is described.

For example, the upper row in FIG. 4 shows a black-level error containing a quantization error obtained as a quantization error amount by the quantization error notification circuit 24 as shown in FIG. 3, and this quantization error amount is supplied from the quantization error reception circuit 31 to the inverse quantization processing circuit 32.

Then, as shown in the lower row in FIG. 4, the quantization error reception circuit 31 can restore the image signal bit precision by subtracting the quantization error amount from the image signal.

Figure 5:
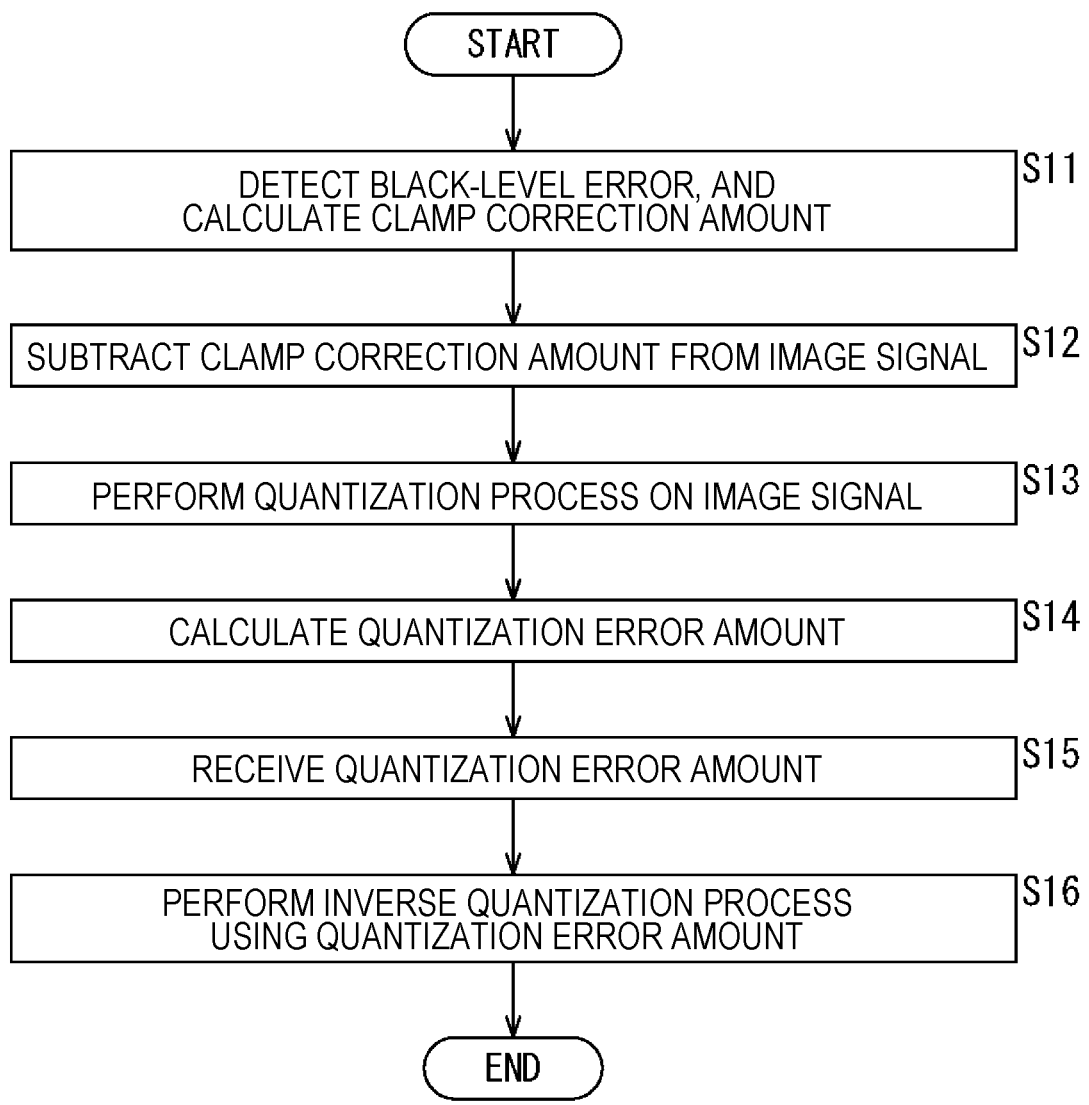
FIG. 5 is a flowchart for explaining a process of transmitting an image signal with the image signal transmission device.

Referring now to the flowchart in FIG. 5, a process to be performed by the image signal transmission device 11 to transmit an image signal is described.

For example, when an image signal equivalent to one frame and an OPB signal are supplied from an imaging element (not shown), the process is started.

In step S11, the black-level error detection circuit 23 detects a black-level error from the OPB signal supplied from the imaging element, and calculates a clamp correction amount that is the difference between the OPB signal average value and the black-level reference value. The black-level error detection circuit 23 then supplies the clamp correction amount to the digital clamp circuit 21, and supplies the black-level error amount and the clamp correction amount to the quantization error notification circuit 24.

In step S12, the digital clamp circuit 21 fixes the black level of the image signal by subtracting the clamp correction amount supplied from the black-level error detection circuit 23 in step S11 from the image signal supplied from the imaging element. The digital clamp circuit 21 then supplies the image signal from which the clamp correction amount has been subtracted to the quantization processing circuit 22.

In step S13, the quantization processing circuit 22 performs a quantization process on the image signal supplied from the digital clamp circuit 21 in step S12, and supplies the quantized image signal to the subsequent stage via the bit precision constraint region 12.

In step S14, using the black-level error amount and the clamp correction amount supplied from the black-level error detection circuit 23 in step S11, the quantization error notification circuit 24 calculates the quantization error amount generated through the quantization process performed by the quantization processing circuit 22. The quantization error notification circuit 24 then notifies the subsequent stage of the calculated quantization error amount via the bit precision constraint region 12.

In step S15, the quantization error reception circuit 31 receives the quantization error amount reported from the quantization error notification circuit 24 in step S14, and supplies the quantization error amount to the inverse quantization processing circuit 32.

In step S16, using the quantization error amount supplied from the quantization error reception circuit 31 in step S15, the inverse quantization processing circuit 32 performs an inverse quantization process on the image signal quantized in step S13, so that the bit precision is restored. The inverse quantization processing circuit 32 then supplies the image signal whose bit precision has been restored to the signal processing device of the subsequent stage (not shown), and the process then comes to an end.

As described above, the image signal transmission device 11 can restore the bit precision of an image signal when transmitting the image signal via the bit precision constraint region 12. Thus, the image signal transmission device 11 can reduce the influence of the quantization error generated through the quantization of the image signal.

Figure 6:
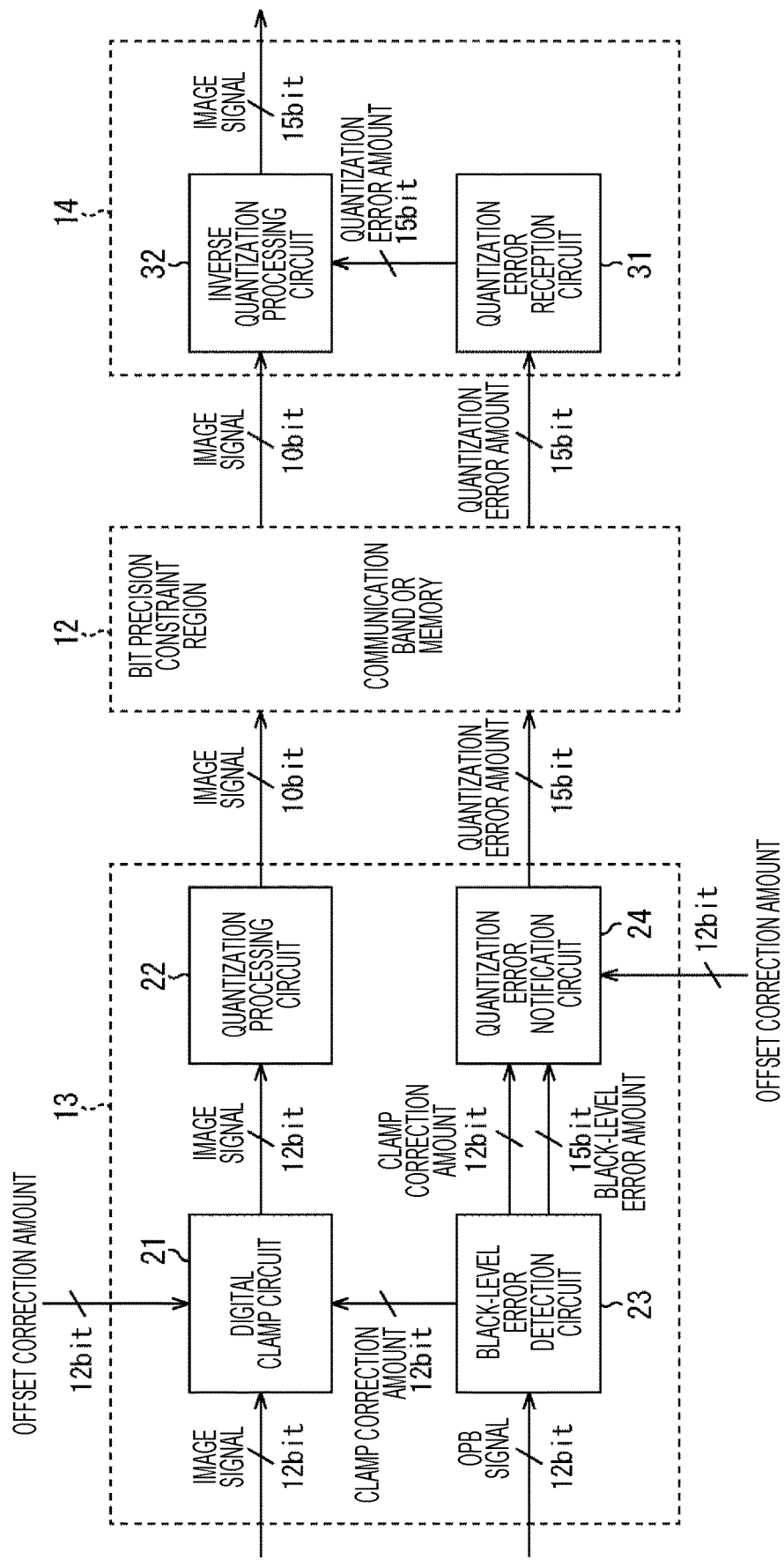
FIG. 6 is a block diagram showing a first modification of the image signal transmission device.

FIG. 6 is a block diagram showing a first modification of the image signal transmission device shown in FIG. 1.

As shown in FIG. 6, an image signal transmission device 11A is designed to have blocks similar to those of the image signal transmission device 11 shown in FIG. 1. However, the image signal transmission device 11A differs from the image signal transmission device 11 shown in FIG. 1 in that an offset correction amount is supplied to the digital clamp circuit 21 and the quantization error notification circuit 24.

For example, if the drive conditions are different between the optical black region and the effective pixel signal region in an imaging device that supplies an image signal to the image signal transmission device 11A, a difference is generated between the pixel signal in the optical black region and the pixel signal in the effective pixel signal region. Therefore, in the image signal transmission device 11A, the digital clamp circuit 21 has a correction function for correcting such a difference, and can correct this difference in accordance with the offset correction amount.

Figure 7:
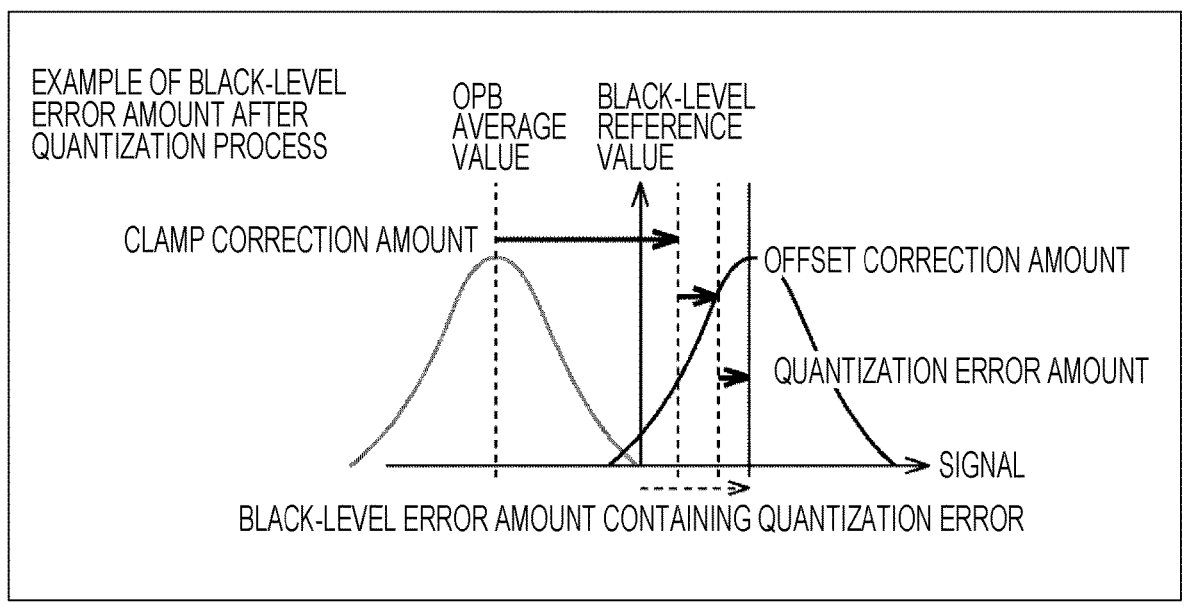
FIG. 7 is a diagram for explaining a process using an offset correction amount.

Also, in the image signal transmission device 11A, the quantization error notification circuit 24 can add an offset amount to the post-quantization-process quantization error amount to be calculated, for example, in accordance with the difference correction performed by the digital clamp circuit 21. That is, the quantization error notification circuit 24 can correct the quantization error amount, using the offset amount as shown in FIG. 7.

As described above, when transmitting an image signal while reducing the influence of a quantization error via the bit precision constraint region 12, the image signal transmission device 11A can correct the difference generated in the black-level image signal.

Figure 8:
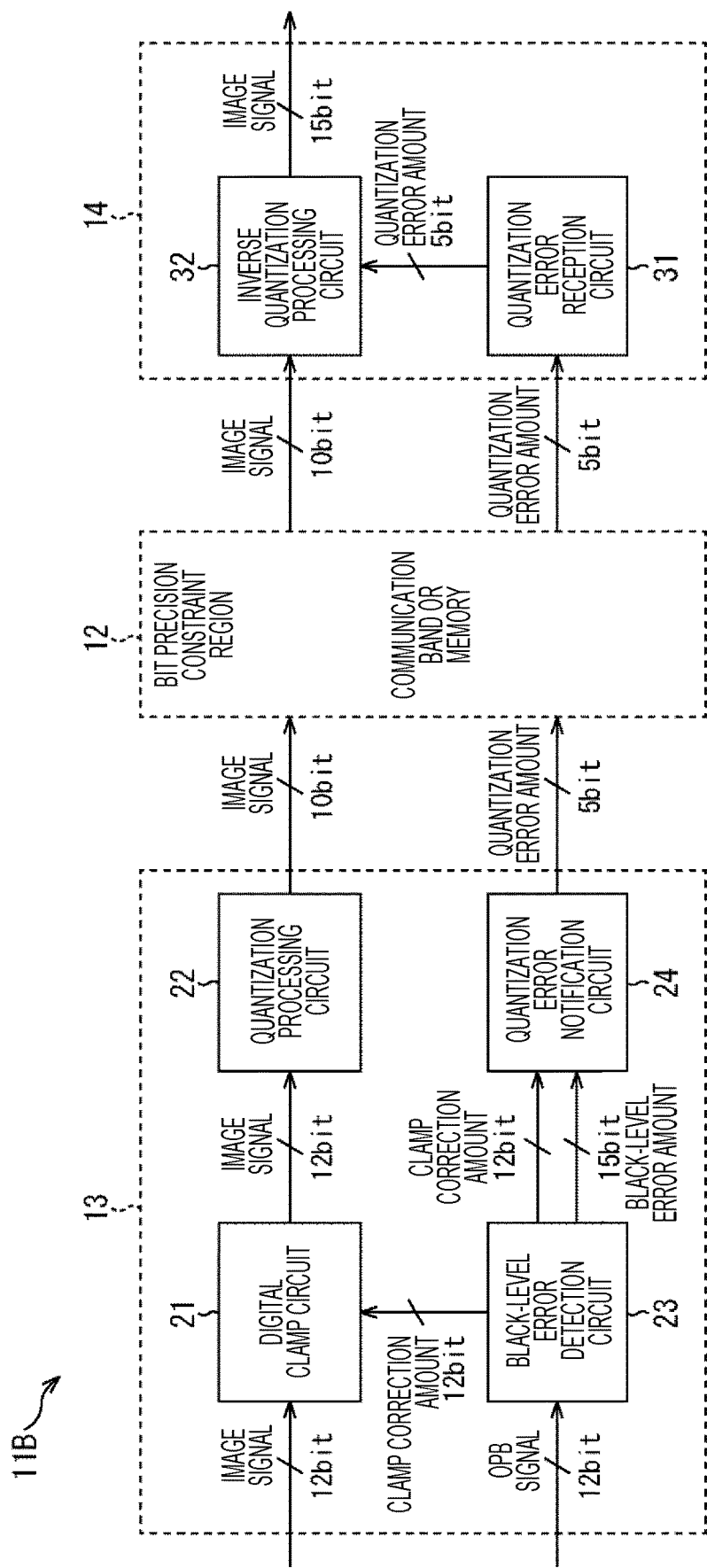
FIG. 8 is a block diagram showing a second modification of the image signal transmission device.

FIG. 8 is a block diagram showing a second modification of the image signal transmission device shown FIG. 1.

As shown in FIG. 8, an image signal transmission device 11B is designed to have blocks similar to those of the image signal transmission device 11 shown in FIG. 1. However, the image signal transmission device 11B differs from the image signal transmission device 11 shown in FIG. 1 in that the number of the bits for the quantization error amount to be reported by the quantization error notification circuit 24 is smaller.

That is, in the image signal transmission device 11 shown in FIG. 1, a 15-bit quantization error amount is reported from the quantization error notification circuit 24. In the image signal transmission device 11B, on the other hand, a 5-bit quantization error amount is reported from the quantization error notification circuit 24.

For example, if it is apparent that there is an upper limit to the quantization error amount to be generated through the quantization process, the higher bit(s) can be deleted from the quantization error amount reported from the quantization error notification circuit 24 in accordance with an effective value, as in the image signal transmission device 11B. Further, in a case where the bit precision to be increased by the inverse quantization processing circuit 32 is lower than the quantization precision for the black-level error in the image processing device (not shown) at the stage after the image signal transmission device 11B, for example, it is possible to delete the lower bit(s) according to the bit precision of the quantization error to be corrected by the inverse quantization processing circuit 32.

In this manner, the image signal transmission device 11B can reduce the number of the bits for the quantization error amount, and thus, can cope with the constraints in the bit precision constraint region 12. That is, in a case where an image signal is transmitted by communication, for example, it is possible to cope with a narrower communication band. In a case where an image signal temporarily stored in a memory is transmitted, a smaller memory amount is used.

Figure 9:
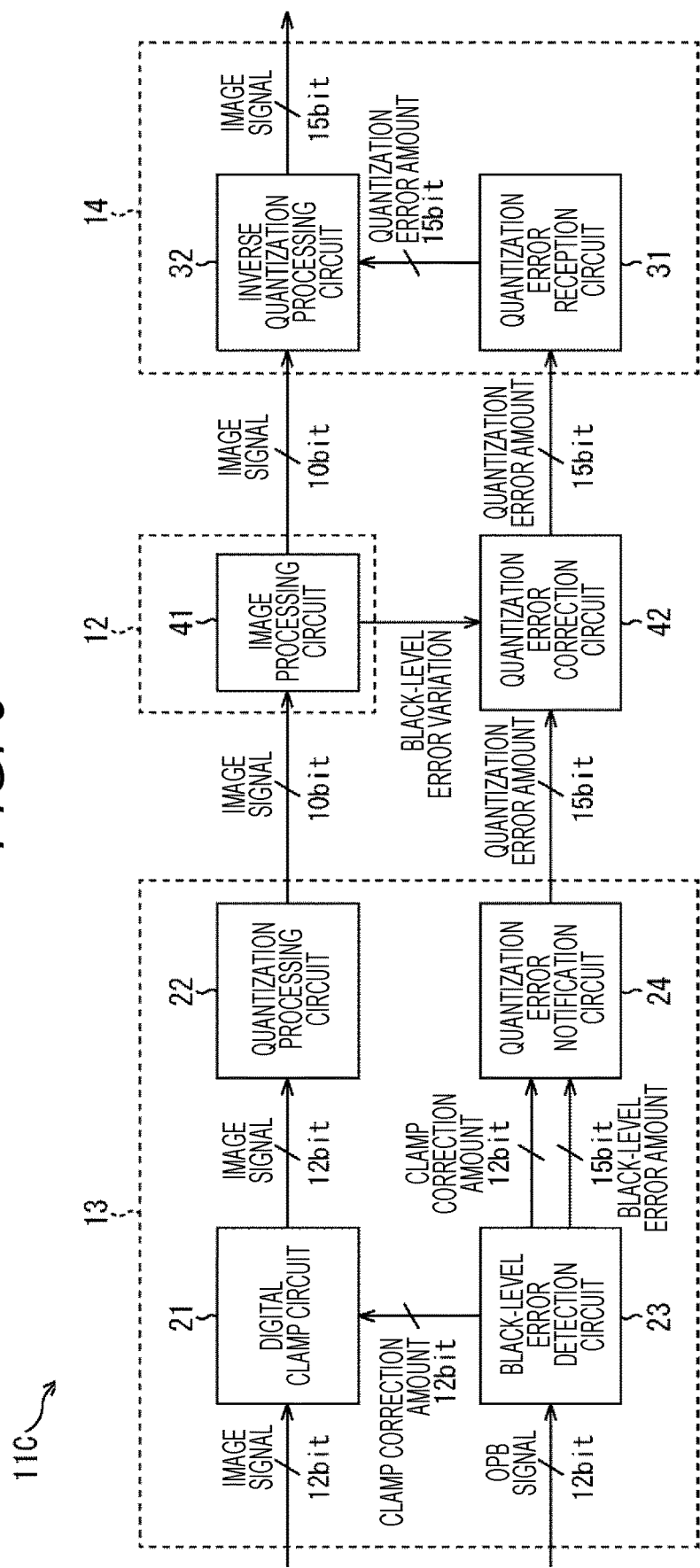
FIG. 9 is a block diagram showing an example configuration of a second embodiment of an image signal transmission device to which the present technology is applied.

FIG. 9 is a block diagram showing an example configuration of a second embodiment of an image signal transmission device to which the present technology is applied.

In an image signal transmission device 11C shown in FIG. 9, the same components as those of the image signal transmission device 11 shown in FIG. 1 are denoted by the same reference numerals as those used in FIG. 1, and detailed explanation thereof is not made herein. That is, in the image signal transmission device 11C, the pre-processing unit 13 and the post-processing unit 14 are designed to be the same as those of the image signal transmission device 11 shown in FIG. 1.

Further, in the image signal transmission device 11C, an image processing circuit 41 is used as the bit precision constraint region 12. That is, an image signal that can be subjected to image processing in the image processing circuit 41 has a smaller number of bits than the image signal input to the image signal transmission device 11C and the image signal to be output from the image signal transmission device 11C.

Furthermore, in a case where the image processing circuit 41 performs image processing in which the black-level error fluctuates, the image signal transmission device 11C is designed to further include a quantization error correction circuit 42. Therefore, the image processing circuit 41 supplies the black-level error variation generated in the image processing to the quantization error correction circuit 42, and, in accordance with the black-level error variation, the quantization error correction circuit 42 corrects the quantization error amount reported from the quantization error notification circuit 24. The image processing circuit 41 then notifies the quantization error reception circuit 31 of the corrected quantization error amount.

Even if the image processing circuit 41 is designed to perform image processing with a small number of bits, the image signal transmission device 11C designed as above can reduce the influence of the quantization error at the stage after the image signal transmission device 11C.

Figure 10:
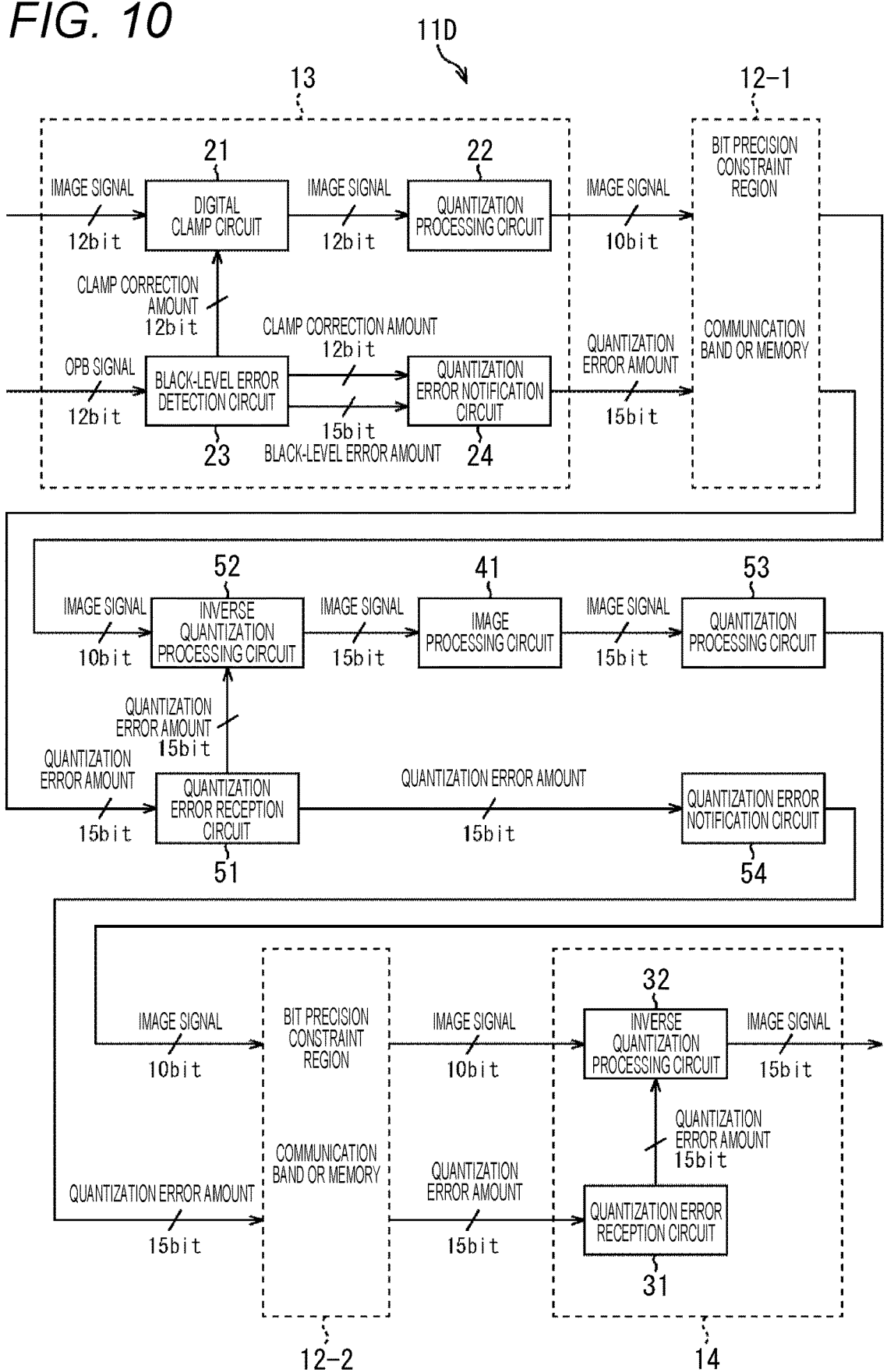
FIG. 10 is a block diagram showing an example configuration of a third embodiment of an image signal transmission device to which the present technology is applied.

FIG. 10 is a block diagram showing an example configuration of a third embodiment of an image signal transmission device to which the present technology is applied.

In an image signal transmission device 11D shown in FIG. 10, the same components as those of the image signal transmission device 11 shown in FIG. 1 are denoted by the same reference numerals as those used in FIG. 1, and detailed explanation thereof is not made herein. That is, in the image signal transmission device 11D, the pre-processing unit 13 and the post-processing unit 14 are designed to be the same as those of the image signal transmission device 11 shown in FIG. 1.

In addition, the image signal transmission device 11D is designed to include two bit precision constraint regions 12-1 and 12-2 between the pre-processing unit 13 and the post-processing unit 14. Further, the image signal transmission device 11D is designed to include an image processing circuit 41, a quantization error reception circuit 51, an inverse quantization processing circuit 52, a quantization processing circuit 53, and a quantization error notification circuit 54, between the bit precision constraint regions 12-1 and 12-2.

That is, in the image signal transmission device 11D, a quantized image signal output from the pre-processing unit 13 is supplied to the inverse quantization processing circuit 52 via the bit precision constraint region 12-1, and a quantization error output from the pre-processing unit 13 is supplied to the quantization error reception circuit 51 via the bit precision constraint region 12-1.

Like the quantization error reception circuit 31, the quantization error reception circuit 51 receives the quantization error, and supplies the quantization error to the inverse quantization processing circuit 52 and the quantization error notification circuit 54. Like the inverse quantization processing circuit 32, the inverse quantization processing circuit 52 performs an inverse quantization process on the quantized image signal using the quantization error amount, and supplies the resultant image signal to the image processing circuit 41. The image signal subjected to the image processing in the image processing circuit 41 is then supplied to the quantization processing circuit 53.

Like the quantization processing circuit 22, the quantization processing circuit 53 performs a quantization process on the image signal supplied from the image processing circuit 41, and supplies the quantized image signal to the subsequent stage via the bit precision constraint region 12-2. Like the quantization error notification circuit 24, the quantization error notification circuit 54 notifies the subsequent stage of the quantization error supplied from the quantization error reception circuit 51 via the bit precision constraint region 12-2.

The image signal transmission device 11D designed as above can reduce the influence of a quantization error, when image processing that requires high bit precision is performed in the image processing circuit 41 disposed between the bit precision constraint regions 12-1 and 12-2. Thus, the image signal transmission device 11D can transmit an image signal subjected to image processing with higher precision.

It should be noted that, in a case where the image processing circuit 41 in the image signal transmission device 11D performs image processing in which the black-level error fluctuates, such as digital gain processing or offset processing, the quantization error notification circuit 54 can calculates a quantization error to which the variation amount has been added.

As described above, with the image signal transmission device 11 of each of the above described embodiments and modifications, a quantization error caused by a black-level error having a uniform tendency in the image signal can be restored through an inverse quantization process, without any increase in the circuit size, the memory capacity, and the communication band.

In addition, the present technology can be applied not only to the image signal transmission device 11 that transmits image signals, but also to a signal transmission device that transmits various kinds of signals with a communication band, a memory, or the like, like the bit precision constraint region 12, under bit precision constraints.

It should be noted that the respective processes described above with reference to the flowchart are not necessarily performed in chronological order in accordance with the sequence shown as the flowchart, but include processes to be performed in parallel or independently of one another (such as parallel processes or object-based processes). Further, a program may be executed by one CPU, or may be executed in a distributive manner by a plurality of CPUs.

Also, the above described series of processes (signal transmission methods) may be performed by hardware, or may be performed by software. In a case where the series of processes are performed by software, the program that forms the software may be installed in a computer incorporated into special-purpose hardware, or may be installed from a program recording medium into a general-purpose computer or the like that can execute various kinds of functions by installing various kinds of programs, for example.

Figure 11:
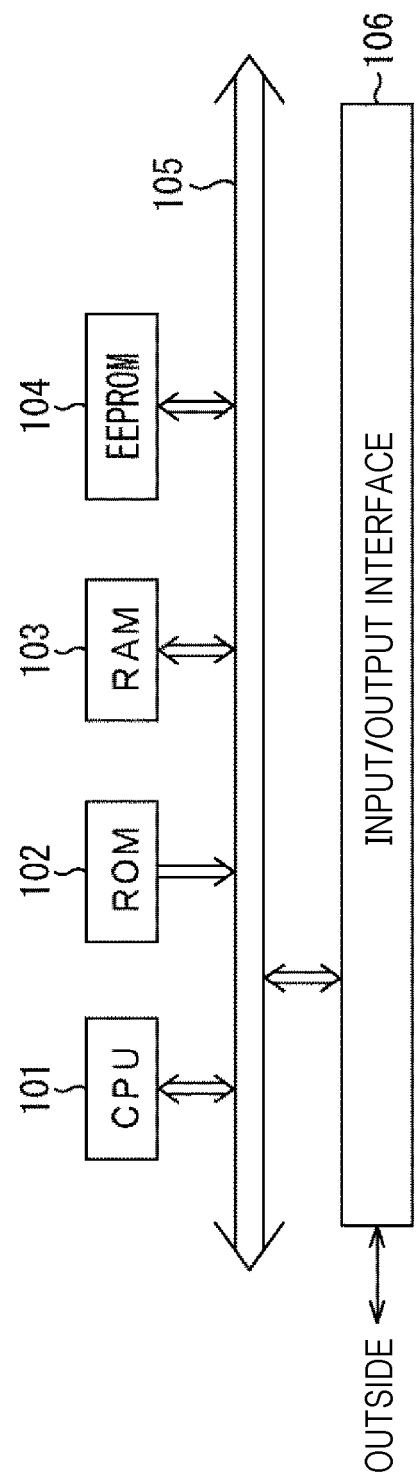
FIG. 11 is a block diagram showing an example configuration of an embodiment of a computer to which the present technology is applied.

FIG. 11 is a block diagram showing an example configuration of the hardware of a computer that performs the above described series of processes in accordance with a program.

In the computer, a central processing unit (CPU) 101, a read only memory (ROM) 102, a random access memory (RAM) 103, and an electronically erasable and programmable read only memory (EEPROM) 104 are connected to one another by a bus 105. An input/output interface 106 is further connected to the bus 105, so that the input/output interface 106 is connected to the outside.

In the computer having the above described configuration, the CPU 101 loads a program stored in the ROM 102 and the EEPROM 104 into the RAM 103 via the bus 105, for example, and executes the program, so that the above described series of processes are performed. Further, the programs to be executed by the computer (CPU101) may be written into the ROM 102 in advance, or may be installed from the outside into the EEPROM 104 via the input/output interface 105 and be updated.

It should be noted that the present technology may also be embodied in the configurations described below.

(1)

A signal transmission device including:

a quantization error notification unit that notifies a stage after a bit precision constraint region of a quantization error generated in a quantization processing unit that performs a quantization process on a signal to be transmitted via the bit precision constraint region, the bit precision constraint region being a region where a bit precision constraint occurs; and a quantization error reception unit that receives the quantization error, and supplies the quantization error to an inverse quantization processing unit that performs an inverse quantization process on the signal transmitted via the bit precision constraint region.

(2)

The signal transmission device according to (1), in which the signal is an image signal, the signal transmission device further includes:

a clamp unit that performs a process of fixing a black level of the image signal; and a black-level error detection unit that calculates a black-level error amount with respect to a reference value for the black level from the image signal in an optical black region, and calculates a clamp correction amount from the black-level error amount in accordance with bit precision in the clamp unit, the black-level error amount representing a black-level error to be actually required, and the quantization error notification unit determines the quantization error from the clamp correction amount and the black-level error amount.

(3)

The signal transmission device according to (2), further including the quantization processing unit that performs a quantization process on the image signal corrected by the clamp unit using the clamp correction amount.

(4)

The signal transmission device according to (2) or (3), further including the inverse quantization processing unit that obtains the image signal quantized by the quantization processing unit via the bit precision constraint region, and, using the quantization error supplied from the quantization error reception unit, performs an inverse quantization process on the obtained image signal.

(5)

The signal transmission device according to any of (2) to (4), in which the clamp unit corrects a difference generated between the image signal in the optical black region and the image signal in an effective pixel region, in accordance with a predetermined offset amount, and the quantization error notification unit corrects the quantization error, using the predetermined offset amount.

(6)

The signal transmission device according to any of (2) to (5), in which the bit precision constraint region is a communication band for transmitting the image signal through communication, and the quantization error notification unit adds the quantization error to the outside of the effective pixel region of the image signal.

(7)

The signal transmission device according to any of (2) to (5), in which the bit precision constraint region is a memory for temporarily storing the image signal, and the quantization error notification unit writes the quantization error into a predetermined region in the memory.

(8)

The signal transmission device according to any of (2) to (5), in which the bit precision constraint region is an image processing unit that performs image processing on the image signal.

(9)

The signal transmission device according to (8), further including a quantization error correction unit that corrects the quantization error reported from the quantization error notification unit, in accordance with a variation of a black-level error generated when the image processing unit performs image processing on the image signal.

(10)

The signal transmission device according to any of (1) to (9), in which a plurality of the bit precision constraint regions are provided between the quantization error notification unit and the quantization error reception unit.

(11)

A signal transmission method including the steps of:

notifying a stage after a bit precision constraint region of a quantization error generated in a quantization processing unit that performs a quantization process on a signal to be transmitted via the bit precision constraint region, the bit precision constraint region being a region where a bit precision constraint occurs; and receiving the quantization error, and supplying the quantization error to an inverse quantization processing unit that performs an inverse quantization process on the signal transmitted via the bit precision constraint region.

(12)

A program for causing a computer to perform a process including the steps of:

notifying a stage after a bit precision constraint region of a quantization error generated in a quantization processing unit that performs a quantization process on a signal to be transmitted via the bit precision constraint region, the bit precision constraint region being a region where a bit precision constraint occurs; and receiving the quantization error, and supplying the quantization error to an inverse quantization processing unit that performs an inverse quantization process on the signal transmitted via the bit precision constraint region.

It should be noted that this embodiment is not limited to the above described embodiments, and various modifications may be made to them without departing from the scope of the present disclosure.

REFERENCE SIGNS LIST

11 Image signal transmission device
12 Bit precision constraint region
13 Pre-processing unit
14 Post-processing unit
21 Digital clamp circuit
22 Quantization processing circuit
23 Black-level error detection circuit
24 Quantization error notification circuit
31 Quantization error reception circuit
32 Inverse quantization processing circuit
41 Image processing circuit
42 Quantization error correction circuit
51 Quantization error reception circuit
52 Inverse quantization processing circuit
53 Quantization processing circuit
54 Quantization error notification circuit

The invention claimed is:

1. A signal transmission device, comprising:
a first processor configured to:
receive an image signal;
determine a quantization error based on a black-level error amount and a clamp correction amount of the image signal, wherein the black-level error amount is associated with a black level of the image signal, and the clamp correction amount is based on the black-level error amount; and
notify a stage subsequent to a bit precision constraint region of the quantization error generated in a quantization process on a signal to be transmitted via the bit precision constraint region, wherein the bit precision constraint region is a region where a bit precision constraint occurs; and
a second processor configured to:
receive the quantization error; and
execute, based on the received quantization error, an inverse quantization process on the signal transmitted via the bit precision constraint region.

2. The signal transmission device according to claim 1, wherein the first processor is further configured to:
determine the black level of the image signal;
determine the black-level error amount with respect to a reference value for the black level from the image signal in an optical black region; and
determine the clamp correction amount based on the black-level error amount, wherein the black-level error amount represents a black-level error of the image signal.

3. The signal transmission device according to claim 2, wherein the first processor is further configured to:
correct the image signal based on the clamp correction amount; and
execute the quantization process on the corrected image signal.

4. The signal transmission device according to claim 3, wherein the second processor is further configured to:
obtain the image signal based on the quantization error; and
execute the inverse quantization process on the obtained image signal.

5. The signal transmission device according to claim 2, wherein the first processor is configured to:
correct a difference generated between the image signal in the optical black region and the image signal in an effective pixel region based on a determined offset amount; and
correct the quantization error based on the determined offset amount.

6. The signal transmission device according to claim 2, wherein
the bit precision constraint region is a communication band for transmission of the image signal, and
the first processor is further configured to add the quantization error to a region outside an effective pixel region of the image signal.

7. The signal transmission device according to claim 2, wherein
the bit precision constraint region is a memory for temporary storage the image signal,
the first processor is further configured to write the quantization error into a determined region in the memory.

8. The signal transmission device according to claim 2, wherein the bit precision constraint region is configured to process the image signal.

9. The signal transmission device according to claim 8, wherein the first processor is further configured to
correct the quantization error based on a variation of the black-level error generated when the image signal is processed.

10. The signal transmission device according to claim 1, further comprising a plurality of bit precision constraint regions.

11. A signal transmission method, comprising:
receiving, by a first processor, an image signal;
determining, by the first processor, a quantization error based on a black-level error amount and a clamp correction amount of the image signal, wherein the black-level error amount is associated with a black level of the image signal, and the clamp correction amount is based on the black-level error amount;
notifying, by the first processor, a stage subsequent to a bit precision constraint region of the quantization error generated in a quantization process on a signal to be transmitted via the bit precision constraint region, wherein the bit precision constraint region is a region where a bit precision constraint occurs;
receiving, by a second processor, the quantization error; and
executing, by the second processor based on the received quantization error, an inverse quantization process on the signal transmitted via the bit precision constraint region.

12. A non-transitory computer-readable medium having stored thereon, computer executable instructions, which when executed by a computer, cause the computer to execute operations, the operations comprising:
receiving, by a first processor, an image signal;
determining, by the first processor, a quantization error based on a black-level error amount and a clamp correction amount of the image signal, wherein the black-level error amount is associated with a black level of the image signal, and the clamp correction amount is based on the black-level error amount;
notifying, by the first processor, a stage subsequent to a bit precision constraint region of the quantization error generated in a quantization process on a signal to be transmitted via the bit precision constraint region, wherein the bit precision constraint region is a region where a bit precision constraint occurs;
receiving, by a second processor, the quantization error; and
executing, by the second processor based on the received quantization error, an inverse quantization process on the signal transmitted via the bit precision constraint region.

* * * * *